US009802149B1

(12) United States Patent
Knox et al.

(10) Patent No.: US 9,802,149 B1
(45) Date of Patent: Oct. 31, 2017

(54) SORBENT-BASED ATMOSPHERE REVITALIZATION SYSTEM

(71) Applicant: The United States of America as represented by the Administrator of NASA, Washington, DC (US)

(72) Inventors: James C Knox, Union Grove, AL (US); Lee A. Miller, Huntsville, AL (US)

(73) Assignee: The United States of America as Represented by the Administrator of NASA, Washington, DC (US)

( * ) Notice: Subject to any disclaimer, the term of this patent is extended or adjusted under 35 U.S.C. 154(b) by 0 days.

(21) Appl. No.: 14/971,256

(22) Filed: Dec. 16, 2015

(51) Int. Cl.
*B01D 53/04* (2006.01)

(52) U.S. Cl.
CPC ..... *B01D 53/0446* (2013.01); *B01D 53/0415* (2013.01); *B01D 53/0454* (2013.01); *B01D 2253/108* (2013.01); *B01D 2253/116* (2013.01); *B01D 2257/504* (2013.01); *B01D 2257/80* (2013.01); *B01D 2259/4145* (2013.01);
(Continued)

(58) Field of Classification Search
CPC ............ B01D 53/0446; B01D 53/0415; B01D 53/0454; B01D 2253/108; B01D 2253/116; B01D 2257/504; B01D 2257/80; B01D 2259/4575; B01D 2259/4145; B01D 2259/4146; B01D 2259/4148
USPC ......... 96/109, 111, 121, 126, 127, 132, 149, 96/146
See application file for complete search history.

(56) References Cited

U.S. PATENT DOCUMENTS

| 1,787,875 | A | * | 1/1931 | Perrott | .................... | A62B 19/00 |
| | | | | | | 252/193 |
| 3,577,988 | A | * | 5/1971 | Jones | ...................... | B63C 11/24 |
| | | | | | | 128/201.25 |

(Continued)

OTHER PUBLICATIONS

L.E. Miller, J.C.Knox, Development and Testing of a Sorbent-Based Atmosphere Revitalization System 2010/2011, 41st International Conf. on Environmental Systems, Jul. 17, 2011, 1-19 pgs., 2011-5217, American Institute of Aeronautics and Astronautics, Portland, Oregon.

(Continued)

*Primary Examiner* — Frank Lawrence
(74) *Attorney, Agent, or Firm* — James J. McGroary

(57) ABSTRACT

The present invention is a sorbent-based atmosphere revitalization (SBAR) system using treatment beds each having a bed housing, primary and secondary moisture adsorbent layers, and a primary carbon dioxide adsorbent layer. Each bed includes a redirecting plenum between moisture adsorbent layers, inlet and outlet ports connected to inlet and outlet valves, respectively, and bypass ports connected to the redirecting plenums. The SBAR system also includes at least one bypass valve connected to the bypass ports. An inlet channel connects inlet valves to an atmosphere source. An outlet channel connects the bypass valve and outlet valves to the atmosphere source. A vacuum channel connects inlet valves, the bypass valve and outlet valves to a vacuum source. In use, one bed treats air from the atmosphere source while another bed undergoes regeneration. During regeneration, the inlet, bypass, and outlet valves sequentially open to the vacuum source, removing accumulated moisture and carbon dioxide.

15 Claims, 3 Drawing Sheets

(52) U.S. Cl.
CPC .............. *B01D 2259/4148* (2013.01); *B01D 2259/4575* (2013.01)

(56) References Cited

U.S. PATENT DOCUMENTS

| | | | |
|---|---|---|---|
| 4,742,761 A | 5/1988 | Horstman | |
| 5,061,455 A * | 10/1991 | Brose | B01D 53/04 423/228 |
| 5,213,593 A * | 5/1993 | White, Jr. | B01D 53/0462 95/99 |
| 5,451,248 A * | 9/1995 | Sadkowski | A23B 7/144 426/419 |
| 5,755,857 A * | 5/1998 | Acharya | B01D 53/0462 96/122 |
| 6,142,151 A | 11/2000 | Dean | |
| 7,608,133 B2 | 10/2009 | Yates et al. | |
| 7,637,988 B2 | 12/2009 | Dean, II | |
| 8,016,914 B2 | 9/2011 | Belanger et al. | |
| 8,157,892 B2 | 4/2012 | Meirav | |
| 8,690,990 B2 * | 4/2014 | Nakamura | B01D 53/0462 95/106 |
| 2009/0095154 A1 * | 4/2009 | Barone | B01D 53/0476 95/96 |
| 2011/0277490 A1 | 11/2011 | Meirav | |
| 2012/0006193 A1 | 1/2012 | Roychoudhury | |
| 2013/0136660 A1 * | 5/2013 | Utaki | B01D 53/0454 422/110 |
| 2013/0291732 A1 | 11/2013 | Meirav | |

OTHER PUBLICATIONS

Mansell, Abney, Miller, Influence of Oxygenated Compounds on Reaction Products in a Microwave Plasma Methane Pyrolysis Assembly for Post-Processing of Sabatier Methane, 41st International Conference on Environmental Systems, Jul. 17, 2011, 2011-5035, American Institute of Aeronautics and Astronautics, Portland, Oregon.

Mulloth, Finn, Carbon Dioxide Adsorption on a 5A Zeolite Designed for CO2 Removal in Spacecraft Cabins, NASA Technical Memorandum-1998-208752, Nov. 1998, 1-9PGS.NASA/AMES Research Center, California.

Greenwood, Abney, Miller, Dahl, Hadley, Wambolt, Wheeler, Increased Oxygen Recovery from Sabatier Systems Using Plasma Pyrolysis Technology and Metal Hydride Separation, 45th International Conference on Environmental Systems, Jul. 12, 2015, 1-13 pgs.,ICES-2015-120, Texas Tech University, Bellevue, Washington.

Miller, Knox, Development and Testing of a Sorbent-Based Atmosphere Revitalization System for the Crew Exploration Vehicle 2008/2009, International Conference on Environmental Systems, Jul. 2009, 1-11 pgs., 2009-1-2445, SAE, Savanna, GA.

Knox, Miller, Howard, Development and Testing of a Sorbent-Based Atmosphere Revitalization System for the Crew Exploration Vehicle 2007/2008, International Conference on Environmental Systems, Jul. 2008,1-13 pgs., 2008-1-2082, SAE, San Francisco, 2008.

* cited by examiner

SORBENT-BASED ATMOSPHERE REVITALIZATION SYSTEM

STATEMENT OF GOVERNMENT INTEREST

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor elected not to retain title.

BACKGROUND OF THE INVENTION

1. Field of Invention

This invention relates to the field of gas separation apparatus, and more specifically to solid sorbent apparatus with plural solid sorbent beds and recovery or separation means for desorbing fluid.

2. Description of Related Art

Life support systems are the most vital part of manned exploration of outer space. Due to the isolated location of spacecraft on exploratory missions, life support systems must possess considerable efficiency, dependability and robustness. These systems must also adhere to limits on mass, size and power consumption.

Experimental space shuttle and space station systems used various chemisorbent amines to remove exhaled carbon dioxide from the shuttle's internal atmosphere. However, the amines could be volatile, unstable and could release atmospheric contaminants. Some spacecraft life support systems use a vacuum swing adsorption (VSA) process utilizing molecular sieve beds to remove carbon dioxide and water vapor generated by respiration and evaporated sweat. However, inefficiencies result from poor regeneration of the closed end of the bed used for VSA. While pressure swing adsorption systems that rely on inert gas purging for regeneration allow increased separation of gasses, they require additional volumes of gas to regenerate the beds. As a result, these systems need large amounts of consumable gas that increase mass during launch and may prove difficult or impossible to obtain during missions.

There is an unmet need in the art for a water and carbon dioxide removal system capable of efficiently accommodating increased numbers of crew without increases in mass, volume or power consumption.

SUMMARY OF THE INVENTION

The present invention is a sorbent-based atmosphere revitalization (SBAR) system including a plurality of treatment beds. Each of the treatment beds includes a bed housing containing a primary moisture adsorbent layer, a secondary moisture adsorbent layer and a primary carbon dioxide adsorbent layer. The treatment beds also include a redirecting plenum between the primary moisture adsorbent layer and the secondary moisture adsorbent layer, an inlet port connected to an inlet valve, an outlet port connected to an outlet valve and a bypass port connected to the redirecting plenum. The SBAR system also includes at least one bypass valve connected to the bypass ports. An inlet channel connects the inlet valves to an atmosphere source. An outlet channel connects the bypass valve and the outlet valves to the atmosphere source. A vacuum channel connects the inlet valves, the bypass valve and the outlet valves to a vacuum source.

An additional embodiment of the present invention is a long-term atmosphere revitalization system that includes a plurality of SBAR systems, as above, and a plurality of cartridge heaters. Each cartridge heater connects to an exterior of each of the treatment beds.

TERMS OF ART

As used herein, the term "baffle plate" means a plate that applies pressure to and constrains a material while allowing fluid flow therethrough.

As used herein, the term "blower" means a device that creates airflow.

As used herein, the term "carbon dioxide adsorbent" means a material capable of adsorbing carbon dioxide.

As used herein, the term "cartridge heater" means a sealed heating coil that generates heat via electrical resistance.

As used herein, the term "moisture adsorbent" means a material capable of adsorbing water.

As used herein, the term "molecular sieve" means material with pores of precise and uniform size capable of blocking larger molecules and adsorbing smaller molecules.

As used herein, the term "plenum" means an enclosed space through which air flows.

DETAILED DESCRIPTION

Figure 1:
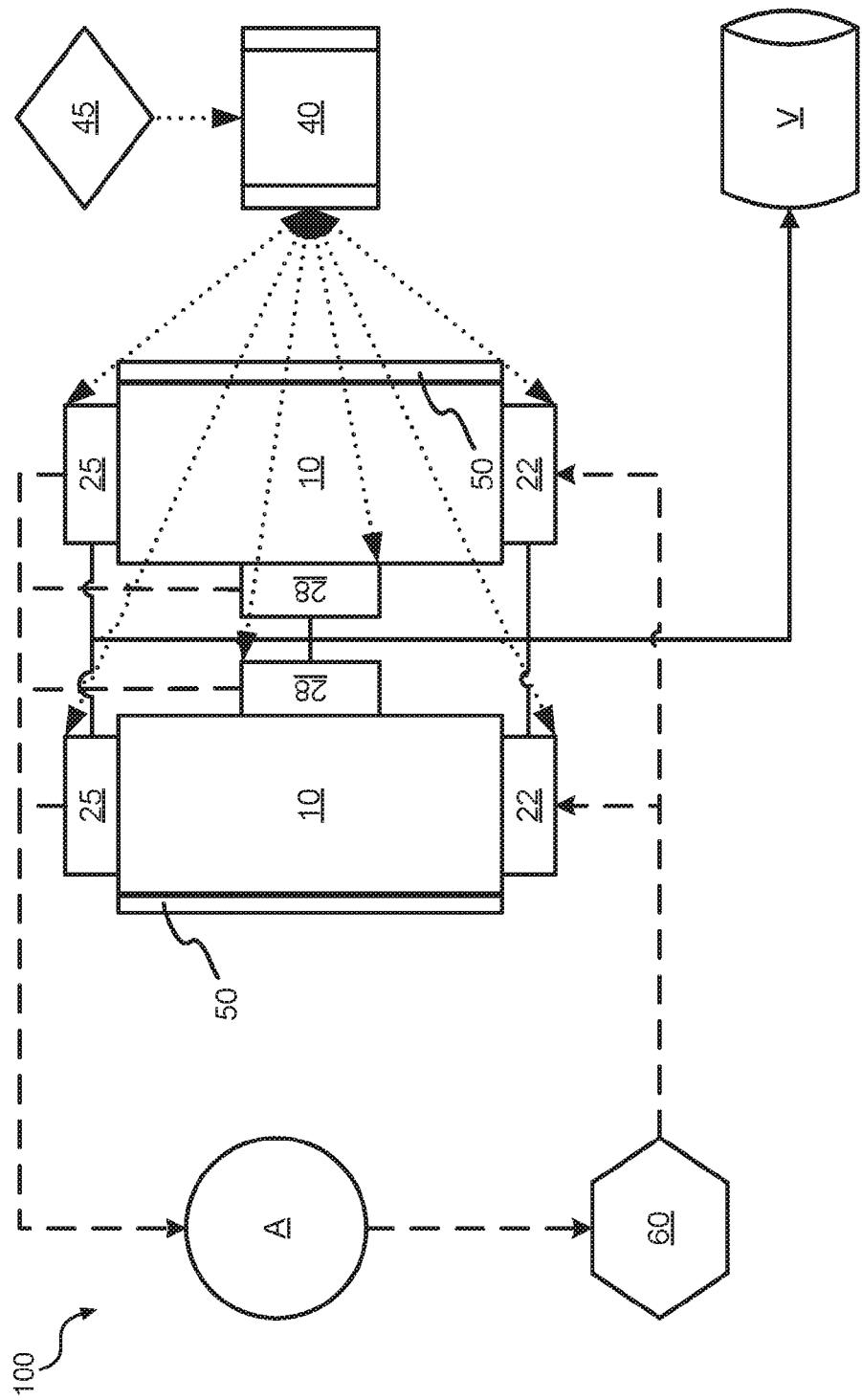
FIG. 1 illustrates a schematic view of a sorbent-based atmosphere revitalization (SBAR) system.

FIG. 1 illustrates a schematic view of sorbent-based atmosphere revitalization (SBAR) system 100. SBAR system 100 includes a plurality of treatment beds 10, a plurality of inlet valves 22, a plurality of outlet valves 25, at least one bypass valve 28, a controller 40, an optional sensor 45, a plurality of optional heating elements 50, and an optional blower 60. Air passes from an atmosphere source A into treatment beds 10, which remove both water vapor and carbon dioxide. Atmosphere source A may be at least one cabin of a vehicle or at least one pressurized garment, such as, but not limited to, space suits. Blower 60 may pull air from atmosphere source A and push it into treatment beds 10. Blower 60 increases the flow rate of air as the levels of water vapor and carbon dioxide increase. Sensor 45 may provide values for percentages of carbon dioxide and/or water vapor present in atmosphere source A to controller 40, which controls the flow rate for blower 60.

In operation, air enters treatment beds 10 through inlet valves 22. After removal of water vapor and carbon dioxide, air returns to atmosphere source A through outlet valves 25. In certain circumstances, a partially treated portion of the air diverts back to atmosphere source A through bypass valve 28. While the partially treated portion of the air has undergone removal of water vapor, it has not undergone removal of carbon dioxide.

Inlet valves 22 and outlet valves 25 are three-way valves. In the exemplary embodiment, inlet valves 22 and outlet valves 25 are multiport high conductance valves. In the exemplary embodiment, bypass valve 28 includes two three-way valves. In other embodiments, bypass valve 28 is a single four-way valve. In the exemplary embodiment, bypass valves 28 are multiport high conductance valves.

Controller 40 determines the amount of air removed through bypass valve 28 based on the percentage of carbon dioxide present in atmosphere source A. Sensor 45 may provide values for percentage of carbon dioxide and/or water vapor present in atmosphere source A to controller 40. In one embodiment, controller 40 is a proportional-integral-derivative (PID) controller that increases the amount of air removed through bypass valve 28 if the percentage of carbon dioxide is below a target value, and decreases the amount of air removed through bypass valves 28 if the percentage of carbon dioxide is above a target value. Controller 40 also connects to inlet valves 22 and outlet valves 25 to control their opening and closing.

Applied vacuum from a vacuum source V "regenerates" treatment beds 10, removing accumulated carbon dioxide and water vapor. Vacuum source V may be a natural vacuum source, such as, but not limited to the vacuum of outer space or an artificial vacuum source, such as, but not limited to a vacuum pump. At any given moment, only one of treatment beds 10 is treating air; the other treatment bed 10 is open to vacuum source V. Once one treatment bed 10 completes regeneration, it begins to treat air while another treatment bed 10 undergoes regeneration. Cycle time is proportional to the amount of water adsorbed by treatment beds 10 in a cycle.

During regeneration, controller 40 opens the three valves of one of treatment beds 10 in a sequence: first, inlet valve 22, then bypass valve 28, then outlet valve 25, ensuring that treatment bed 10 regenerates completely. This sequencing ensures that the section of treatment bed 10 with the highest concentration of water opens to vacuum first, preventing water from migrating to areas of treatment bed 10 with a lower concentration. At the end of each half-cycle, both treatment beds 10 are temporarily isolated from both atmosphere source A and vacuum source V and allowed to equalize with each other. This decreases the amount of ullage gas lost during half-cycle changes before the other treatment bed 10 begins regeneration.

Under normal circumstances, regeneration by vacuum only is sufficient. However, SBAR system 100 may require additional measures during exceptionally extended use or under extremely heavy loads. In such a case, SBAR system 100 exposes both treatment beds 10 to vacuum while heating treatment beds 10 using heating elements 50. In the exemplary embodiment, heating elements 50 are cartridge heaters attached to the exterior of treatment beds 10. Each treatment bed 10 has at least one attached heating element 50. Fins carry heat from each attached heating element 50 into the respective treatment bed 10, resulting in increased levels of regeneration. However, because all treatment beds 10 of SBAR system 100 undergo regeneration at the same time, another SBAR system 100 is necessary to continue atmospheric processing.

Figure 2:
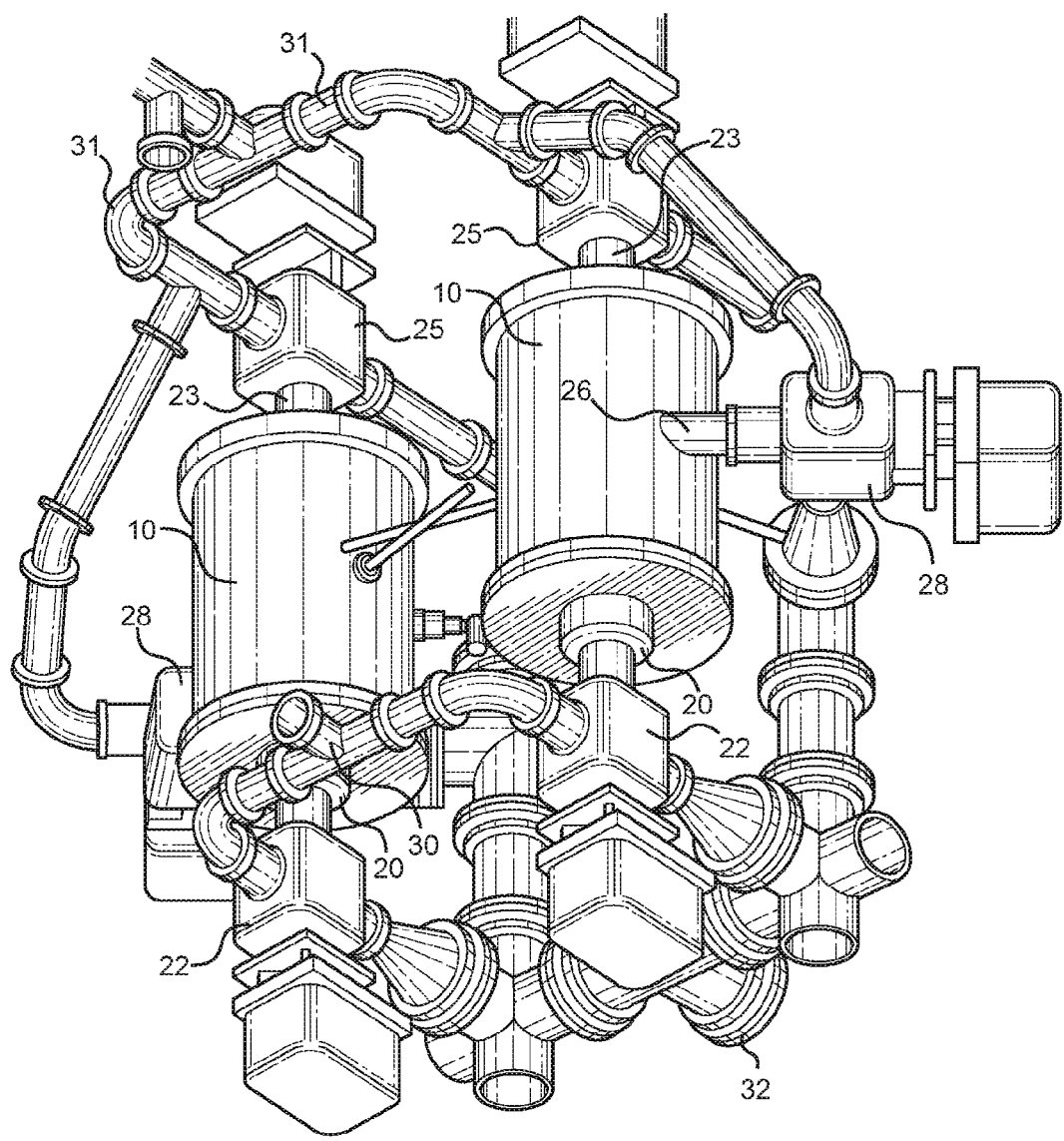
FIG. 2 illustrates a magnified view of a portion of an SBAR system.

FIG. 2 illustrates a magnified view of a portion of SBAR system 100. This view further shows inlet ports 20, outlet ports 23, bypass ports 26, inlet channel 30, outlet channel 31 and vacuum channel 32. Inlet ports 20 connect treatment beds 10 to inlet valves 22. Outlet ports 23 connect treatment beds 10 to outlet valves 25. Bypass ports 26 connect treatment beds 10 to bypass valves 28. Inlet channel 30 connects atmosphere source A to inlet valves 22. Outlet channel 31 connects outlet valves 25 and bypass valve 28 to atmosphere source A. Vacuum channel 32 connects inlet valves 22, outlet valves 25, and bypass valve 28 to vacuum source V.

Figure 3:
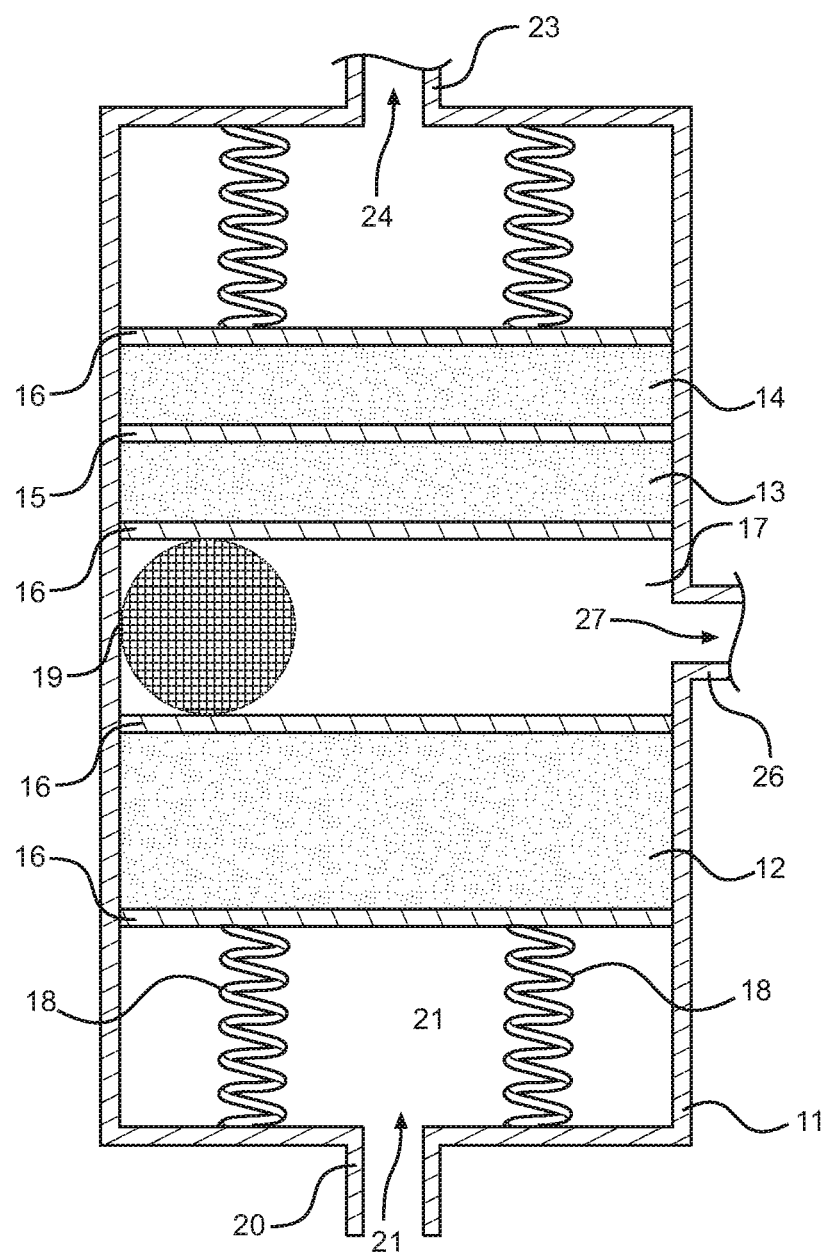
FIG. 3 illustrates a cross-sectional view of a first bed.

FIG. 3 illustrates a cross-sectional view of one of treatment beds 10. Treatment bed 10 includes a bed housing 11, a primary moisture adsorbent layer 12, a secondary moisture adsorbent layer 13, a primary carbon dioxide adsorbent layer 14, a screen 15, a plurality of baffle plates 16, a redirecting plenum 17 with a plenum spacer 19, a plurality of baffle springs 18, an inlet gas stream 21, an outlet gas stream 24 and a bypass gas stream 27. Each treatment bed 10 contains substantially identical inner structures.

Bed housing 11 houses and protects the internal structures of treatment beds 10. In the exemplary embodiment, bed housing 11 is an aluminum canister. Inlet gas stream 21 enters bed housing 11 through inlet port 20 at a first end of bed housing 11. Outlet gas stream 24 exits bed housing 11 through outlet port 23 at a second end of bed housing 11.

Upon entering bed housing 11, inlet gas stream 21 passes through primary moisture adsorbent layer 12, which removes most of the water vapor content from inlet gas stream 21. Bypass gas stream 27, a controlled portion of the dehydrated inlet gas stream 21, bypasses secondary moisture adsorbent layer 13 and primary carbon dioxide adsorbent layer 14, and returns to atmosphere source A. The remainder of inlet gas stream 21 passes through secondary moisture adsorbent layer 13 to remove any residual moisture and then through primary carbon dioxide adsorbent layer 14 to remove carbon dioxide. The controlled bypass of secondary moisture adsorbent layer 13 and primary carbon dioxide adsorbent layer 14 extends the operational time of SBAR system 100 without requiring thermal regeneration.

Primary moisture adsorbent layer 12, secondary moisture adsorbent layer 13 and primary carbon dioxide adsorbent layer 14 are physical adsorbents that do not change geometrically or chemically upon adsorbing water or carbon dioxide molecules from inlet gas stream 21. Physical adsorbents have inherent chemical stability and have the added benefit of trace contaminant removal. In one embodiment, primary moisture adsorbent layer 12, secondary moisture adsorbent layer 13 and primary carbon dioxide adsorbent layer 14 are packed molecular sieves such as, but not limited to silica gel and zeolite. In the exemplary embodiment, primary moisture adsorbent layer 12 and secondary moisture adsorbent layer 13 are zeolite 13X, while primary carbon dioxide adsorbent layer 14 is zeolite 5A.

Screen 15 separates secondary moisture adsorbent layer 13 and primary carbon dioxide adsorbent layer 14. In the exemplary embodiment, screen 15 is stainless steel having a mesh size sufficient to prevent the packed granular materials of secondary moisture adsorbent layer 13 and primary carbon dioxide adsorbent layer 14 from intermixing.

Baffle plates 16 further separate the various sections within treatment beds 10. Baffle plates 16 are located between inlet port 20 and primary moisture adsorbent layer 12, between primary moisture adsorbent layer 12 and redirecting plenum 17, between redirecting plenum 17 and secondary moisture adsorbent layer 13 and between primary carbon dioxide adsorbent layer 14 and outlet port 23. In the exemplary embodiment, baffle plates 16 are stainless steel, aluminum, or any other metallic material or combination thereof. Redirecting plenum 17 is a space between baffle plates 16 located between primary moisture adsorbent layer 12 and secondary moisture adsorbent layer 13. Each redirecting plenum 17 connects to one of bypass ports 26 to allow outgassing of bypass gas stream 27. A plenum spacer 19 separating baffle plates 16 ensures that redirecting plenum 17 maintains its size, even under pressure.

Baffle springs 18 are located at either end of bed housing 11 between bed housing 11 and two baffle plates 16 (specifically, baffle plates 16 contacting primary moisture adsorbent layer 12 and primary carbon dioxide adsorbent layer 14). Baffle springs 18 press primary moisture adsorbent layer 12, secondary moisture adsorbent layer 13, primary carbon dioxide adsorbent layer 14 and redirecting plenum 17 together. This pressure keeps the granular materials of primary moisture adsorbent layer 12, secondary moisture adsorbent layer 13, primary carbon dioxide adsorbent layer 14 packed and in place.

Tests and analyses have verified that SBAR system 100 is a viable and safe system for water and carbon dioxide removal functions for manned space vehicles. The testing confirmed that SBAR system 100 met water and carbon dioxide removal requirements for standard duration missions for a crew of six without requiring thermal regeneration. Testing also validated use of SBAR system 100 with different crew sizes and longer mission durations.

Full-scale testing of SBAR system 100 demonstrated that significant volume reductions and carbon dioxide removal efficiency increases are possible via the use of multiple vacuum ports, along with the controlled bypass and timing of vacuum exposure. The modification to the SBAR system 100 to bypass a portion of the airflow around primary carbon dioxide adsorbent layer 14 significantly extended the time before a thermal regeneration was necessary. Testing with the full 2-bed SBAR system 100 showed that the air-save bed pressure equalization steps in the SBAR system 100 operation cycle had minimal effect on performance.

It will be understood that many additional changes in the details, materials, procedures and arrangement of parts, which have been herein described and illustrated to explain the nature of the invention, may be made by those skilled in the art within the principle and scope of the invention as expressed in the appended claims.

It should be further understood that the drawings are not necessarily to scale; instead, emphasis has been placed upon illustrating the principles of the invention. Moreover, the terms "substantially" or "approximately" as used herein may be applied to modify any quantitative representation that could permissibly vary without resulting in a change in the basic function to which it is related.

What is claimed is:

1. A sorbent-based atmosphere revitalization (SBAR) system, comprising:
    a plurality of treatment beds, wherein each of said plurality of treatment beds comprises:
        a bed housing containing a primary moisture adsorbent layer, a secondary moisture adsorbent layer and a primary carbon dioxide adsorbent layer,
        a redirecting plenum between said primary moisture adsorbent layer and said secondary moisture adsorbent layer,
        an inlet port connected to an inlet valve,
        an outlet port connected to an outlet valve,
        a bypass port connected to said redirecting plenum;
    at least one bypass valve connected to said bypass ports;
    an inlet channel connecting said inlet valves to an atmosphere source;
    an outlet channel connecting said at least one bypass valve and said outlet valves to said atmosphere source;
    a vacuum channel connecting said inlet valves, said at least one bypass valve and said outlet valves to a vacuum source;
    at least one controller connected to said inlet valve, said outlet valve and said at least one bypass valve, wherein said controller is configured to sequentially open said inlet valve, said at least one bypass valve and said outlet valve from a single treatment bed of said plurality of treatment beds to said vacuum source;
    at least one sensor capable of detecting at least one of carbon dioxide percentage and water vapor percentage in said atmosphere source; and
    wherein said at least one controller is configured to open said at least one bypass valve to said atmosphere source based on a proportional-integral-derivative algorithm, wherein said at least one bypass valve is opened when said carbon dioxide percentage is below a target value and closed when said carbon dioxide percentage is above a target value.

2. The system of claim 1, wherein said primary moisture adsorbent layer, said secondary moisture adsorbent layer and said primary carbon dioxide adsorbent layer comprise molecular sieve materials.

3. The system of claim 2, wherein said primary moisture adsorbent layer and said secondary moisture adsorbent layer comprise zeolite 13X.

4. The system of claim 2, wherein said primary carbon dioxide adsorbent layer comprises zeolite 5A.

5. The system of claim 1, wherein said inlet valve and said outlet valve comprise three-way valves.

6. The system of claim 1, wherein at least one of said inlet valve, said outlet valve and said at least one bypass valve comprises a multiport high conductance valve.

7. The system of claim 1, wherein said at least one bypass valve comprises a plurality of three-way valves, wherein each of said plurality of three-way valves is connected to a single bypass port.

8. The system of claim 1, wherein said at least one bypass valve comprises at least one four-way valve, wherein said at least one four-way valve is connected to at least two of said bypass ports.

9. The system of claim 1, further comprising a plurality of baffle plates located between said inlet port and said primary moisture adsorbent layer, between said primary moisture adsorbent layer and said redirecting plenum, between said redirecting plenum and said secondary moisture adsorbent layer and between said primary carbon dioxide adsorbent layer and said outlet port.

10. The system of claim 9, further comprising a plurality of baffle springs, wherein said plurality of baffle springs are located between a first end of said bed housing and a baffle plate contacting said primary moisture adsorbent layer, wherein said plurality of baffle springs are also located between a second end of said bed housing and a baffle plate contacting said primary carbon dioxide adsorbent layer.

11. The system of claim 1, further comprising a screen located between said secondary moisture adsorbent layer and said primary carbon dioxide adsorbent layer.

12. The system of claim 1, wherein said at least one controller is configured to cycle between said plurality of treatment beds based on said water vapor percentage.

13. The system of claim 1, further comprising a blower in said inlet channel.

14. The system of claim 1, wherein said atmosphere source is chosen from the group consisting of: at least one cabin of a vehicle and at least one pressurized garment.

15. The system of claim 1, wherein said vacuum source is chosen from the group consisting of: a natural vacuum source and an artificial vacuum source.

* * * * *